(12) United States Patent
Westman et al.

(10) Patent No.: US 8,443,757 B2
(45) Date of Patent: May 21, 2013

(54) MILKING SYSTEM, METHOD OF CLEANING A MILKING SYSTEM AND MONITORING CLEANING OF A MILKING SYSTEM

(75) Inventors: Anders Westman, Ronninge (SE); Anders Thylen, Tumba (SE)

(73) Assignee: DeLaval Holding AB, Tumba (SE)

( * ) Notice: Subject to any disclaimer, the term of this patent is extended or adjusted under 35 U.S.C. 154(b) by 408 days.

(21) Appl. No.: 12/675,226

(22) PCT Filed: Aug. 29, 2008

(86) PCT No.: PCT/SE2008/050978
§ 371 (c)(1),
(2), (4) Date: Feb. 25, 2010

(87) PCT Pub. No.: WO2009/029041
PCT Pub. Date: Mar. 5, 2009

(65) Prior Publication Data
US 2011/0041770 A1    Feb. 24, 2011

(30) Foreign Application Priority Data
Aug. 31, 2007 (SE) ........................................ 0701961

(51) Int. Cl.
*A01J 5/00* (2006.01)
(52) U.S. Cl.
USPC ........................................................ 119/14.15
(58) Field of Classification Search
USPC ........................................................ 119/14.15
See application file for complete search history.

(56) References Cited

U.S. PATENT DOCUMENTS

| 4,015,618 | A | | 4/1977 | Schmid | |
|---|---|---|---|---|---|
| 4,222,346 | A | * | 9/1980 | Reisgies | 119/14.18 |
| 4,366,943 | A | * | 1/1983 | Licary | 251/30.02 |
| 4,572,105 | A | * | 2/1986 | Chowdhury et al. | 119/14.18 |
| 5,896,828 | A | | 4/1999 | Kronschnabel et al. | |
| 6,089,242 | A | | 7/2000 | Buck | |
| 6,199,507 | B1 | * | 3/2001 | Cassells | 119/14.02 |
| 8,025,029 | B2 | * | 9/2011 | Torgerson et al. | 119/14.18 |
| 8,033,247 | B2 | * | 10/2011 | Torgerson et al. | 119/14.47 |
| 2011/0120378 | A1 | * | 5/2011 | Johannesson | 119/14.18 |

OTHER PUBLICATIONS

International Search Report dated Nov. 6, 2008. from corresponding PCT application.

* cited by examiner

*Primary Examiner* — Kristen C Hayes
(74) *Attorney, Agent, or Firm* — Young & Thompson

(57) ABSTRACT

A method and system for cleaning of milking systems—creates slugs of cleaning liquid in milking systems in response to the detection of the presence of cleaning liquid. The milking system includes a milk conduit (3), a liquid sensor (4) for detecting the presence of liquid in the milk conduit (3), a vacuum source (7) for applying a suction pressure to the milk conduit and cleaning equipment (12, 13) including elements supplying cleaning liquid into the milk conduit and an air injector (16) arranged to supply air into the milk conduit, the system being adapted to supply cleaning liquid into the milk conduit, apply a suction pressure to the cleaning liquid and supply air so that a liquid slug is created that flushes the milk conduit. The liquid sensor (4) is adapted to sense the presence of cleaning liquid supplied to the milk conduit, and the system is adapted to supply the air based on the detection of the presence of cleaning liquid. The sensing of the sensor (4) is also used for evaluating performance of cleaning operations.

9 Claims, 2 Drawing Sheets

MILKING SYSTEM, METHOD OF CLEANING A MILKING SYSTEM AND MONITORING CLEANING OF A MILKING SYSTEM

FIELD OF INVENTION

The present invention relates generally to milking systems and to cleaning of milking systems. Especially it concerns the creation of slugs of cleaning liquid in milking systems.

BACKGROUND

Modern milking systems comprise milking stations able to milk animals, such as cows, and draw the milk from the teats by means of a vacuum source, and transport the milk to a milk container. The milk is a vulnerable food product with high demands for cleanliness and handling temperatures and it is important to protect it from micro organisms and prevent chemical reactions. Thus, the equipment, including conduits, containers, valves etc, of such a milking system has to be cleaned regularly. A way to wash the equipment is to empty the system from milk and use a vacuum source to draw a cleaning liquid through the system to remove milk remains. To increase the efficiency of the drawn cleaning liquid, cleaning equipment controlling air injectors to create slugs of cleaning liquid in the system can be used. An example of such a system is described in the U.S. Pat. No. 5,896,828.

U.S. Pat. No. 5,896,828 shows a milking parlor comprising milking equipment connected to a milk line and a cleaning system comprising a wash line connectable to the milk line providing a clean-in-place cleaning system. During cleaning, the wash line supplies wash water to the milk line, via teat cups at milking stations, which water is drawn through the milk line. The cleaning action in the milk line can be enhanced by periodic injections of air into the wash line, thus creating slugs of water rushing through the wash line, through the teat cups and further through the milk line.

A problem is that there has to be enough water in the line to create the slugs. When setting the timing of the injections, as during installation of new equipment, there is the risk that air will be injected when the amount of water is too small or that the timings will be set with too long waiting time to be sure that the water amount is large enough, the latter causing unnecessary large water consumption.

U.S. Pat. No. 6,089,242, describes (see FIG. 3) a milking facility and a wash system for monitoring and controlling a wash cycle of the milking facility. It includes a wash system wherein wash liquid, like water, is provided from a cleaning line 62 into a milk line 62 via a milking unit 66 (teat cups). The wash system is provided with an air injector 94 injecting air into the milk line 60 to create slugs of wash liquid in the milk line. The system can monitor and control wash system parameters (column 8, line 45-56). For this purpose it includes a sensor 95 measuring the flow in the milk line 60 and the wash liquid slugs are monitored. If the size of the slugs are out of range the wash liquid volume can be increased by adding water through an "add-a-water" line 92 (column 7, line 29-33) connecting the cleaning line 62 and the milk line 60. The add-a-water line 92 bypasses the milking unit 66.

This system can add cleaning liquid, such as water, to create better slugs but if the amount of water is more than enough it may lead to a too large water consumption. Moreover, the add-a-water line bypasses the milking unit, so that not all cleaning liquid passes the milking unit, which bypassing does not contribute to, and may in fact counteract, a proper flow of cleaning liquid through the milking unit.

SUMMARY OF THE INVENTION

An object of the present invention is to overcome the problems in the prior art and enhance the reliability of the slug creation and better ensure the cleaning of a milking system.

Also, an object of the invention is to prevent an unnecessary large consumption of cleaning liquid, such as water, during cleaning of a milking system.

According to the invention there is provided a method for cleaning a milking system, comprising a milk conduit and a liquid detecting sensor.

The method comprises the steps of:
 supplying cleaning liquid into the milk conduit,
 applying a suction pressure in front of the liquid in the milk conduit, and
 supplying air so that a liquid slug is created that flushes the milk conduit. It is characterised by the steps of:
 sensing the presence of cleaning liquid in the milk conduit prior to the step of supplying air, and
 performing said step of supplying of air based on said step of sensing.

In this way it can be ensured that sufficient cleaning liquid to create a slug is present in the milk conduit when the air is supplied. Depending on the actual dimensions of the conduit and its design the actual sufficient amount of cleaning liquid for creating a slug will vary between different milking systems. The sufficient amount can be determined in different ways during cleaning, e.g. measuring the flow of liquid into the conduit or measuring a liquid level in the conduit.

By controlling the supply of air on the basis of the presence of cleaning liquid proper slugs can be created without affecting the supply of cleaning liquid. In this way a sufficient amount of cleaning liquid is guaranteed, without the need to add cleaning liquid through additional lines.

The milking system comprises at least one milking station including teat cups to be attached to an animal to be milked. During cleaning, all liquid has to pass said milking stations in order to enter the milk conduit. An advantage with the milking system is that no additional cleaning lines are needed.

The invention provides a method wherein the amount of liquid in the milk line is used for determining when to inject air into the liquid. The liquid sensing may, for example, be performed by flow meters, level measurers or other detectors and the result of the sensing is used to control the injections when the amount of cleaning liquid is suitable to create a slug that flushes the milk conduit.

In this way the air injections may, for example, be controlled in real-time by sensing the presence of cleaning liquid so that, when a sufficient amount is present, at least one air injector is instructed to supply air.

It is also possible to use the sensing of the presence of cleaning liquid as a basis to set a timing or injection time for the air injections, which is subsequently used to control the air injections. The time for filling the conduit to a level that is sufficient to create a slug upon air injection may suitably be measured during installation and an internal clock of the system is subsequently used during cleaning to determine the time since the supply of cleaning liquid is initiated and the air injector is activated when the filling time lapse. The filling time may also be updated at intervals by measurements subsequently performed during cleaning operations. Thus the timing of an air injector is set so that the air injector injects air when the amount of cleaning liquid, for example at the milking stations, is enough for proper slug creation.

Also, the performance of the cleaning operation can be monitored and changes, e.g. malfunctions, can be detected.

The invention also provides a milking system with cleaning equipment. The milking system comprises a milk conduit, a liquid sensor for detecting the presence of liquid in the milk conduit, a vacuum source for applying a suction pressure to the milk conduit. The cleaning equipment includes means for supplying cleaning liquid into the milk conduit and an air injector arranged to supply air into the milk conduit. The milking system is adapted to supply cleaning liquid into the milk conduit, apply a suction pressure in front of the cleaning liquid and supply air behind the cleaning liquid so that a liquid slug is created that flushes the milk conduit. The milking system is characterised in that the liquid sensor is adapted to detect the presence of cleaning liquid supplied to the milk conduit, and the system is adapted to supply said air based on the detection of the presence of cleaning liquid. Hereby, a milking system having cleaning equipment is provided that can provide the benefits of the invention and can perform the inventive method.

Further preferred embodiments are defined by the dependent claims.

BRIEF DESCRIPTION OF DRAWINGS

The invention is now described, by way of example, with reference to the accompanying drawings, in which.

DETAILED DESCRIPTION OF PREFERRED EMBODIMENTS

In the following a detailed description of a preferred embodiment of the present invention will be given.

Figure 1:
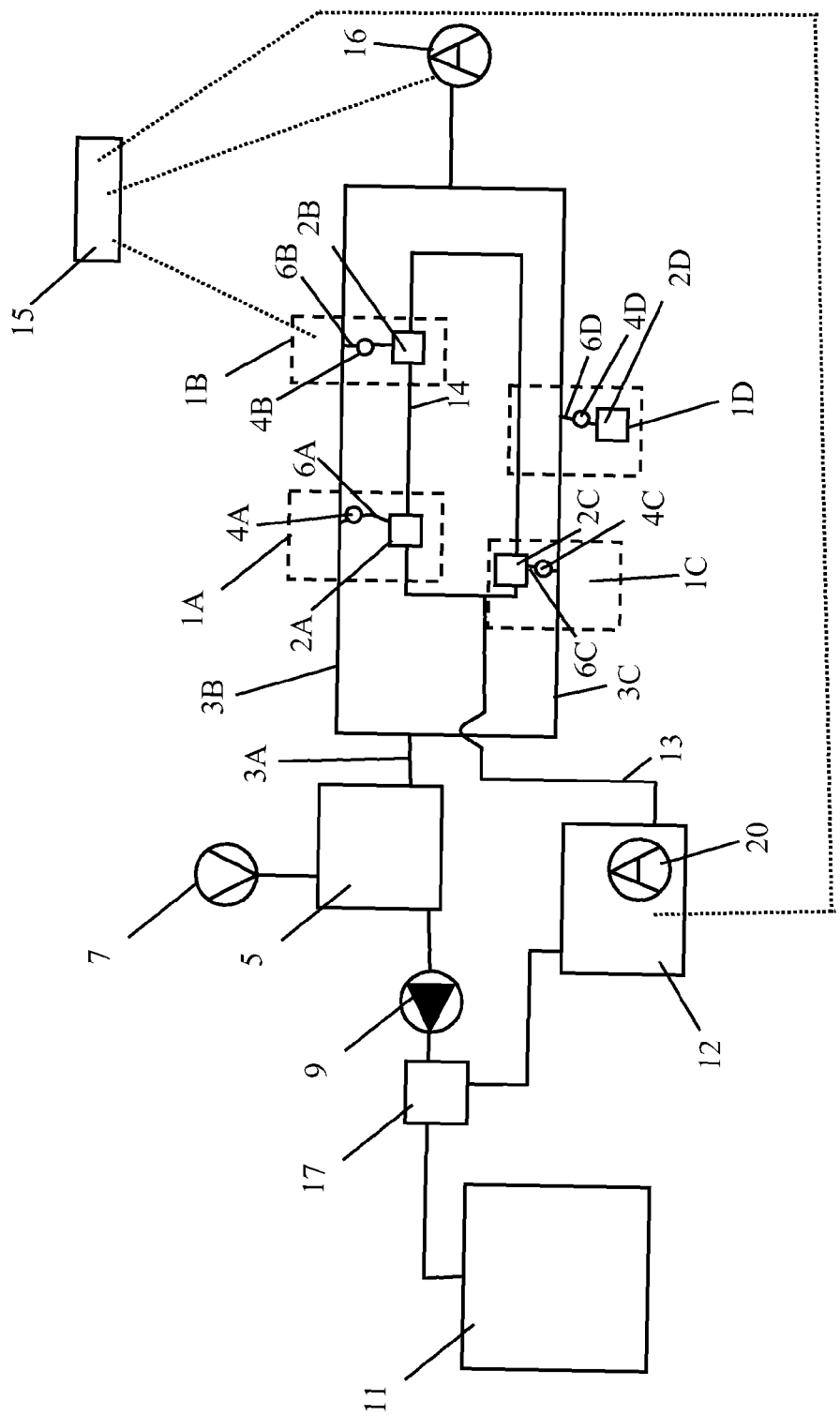
FIG. 1 illustrates schematically a milking system with cleaning equipment for providing cleaning liquid to the milking system.

FIG. 1 illustrates a milking system comprising a plurality of milking stations 1A-D each including a plurality of teat cups, illustrated as single units 2A-D, for attaching to the teats of the animal to be milked. The milking system further comprises, in the milk flow direction from the animal, a milk conduit 3, a milk receiver 5, a milk pump 9 and a milk cooling tank 11. The milk conduit 3 comprises milk hoses 6A-D placed at each milking station 1A-D, and milk lines 3A-C for milk flowing from a plurality of milking stations 1A-D. The milk receiver 5 is also connected to a vacuum source 7, which is adapted to provide a suction vacuum in the receiver. At each milking station is arranged a milk meter 4A-D for measuring the flow of milk from the animal through the milk conduit 3. Each milk meter is mounted in the respective milk hose 6A-D of the milk conduit 3 at the respective milking station 1A-D. The vacuum source 7 is connected to the receiver 5 and the receiver is connected to the teat cups 2A-D via the milk conduit 3 (3B to 3A or 3C to 3A in the figure), so that milk is drawn from the animal by means of the teat cups 2A-D into the milk conduit 3 and flows through the milk conduit 3 to the receiver 5 during milking of the animal. From the receiver 5 the milk is then pumped further along the milk conduit 3 by the milk pump 9 to the milk cooling tank 11. The milk conduit 3A is illustrated as a common milk line for milk from the milking stations to the receiver, but instead of a common line it can comprise a plurality of lines, one for each milking station, each connected to the receiver 5.

Figure 2:
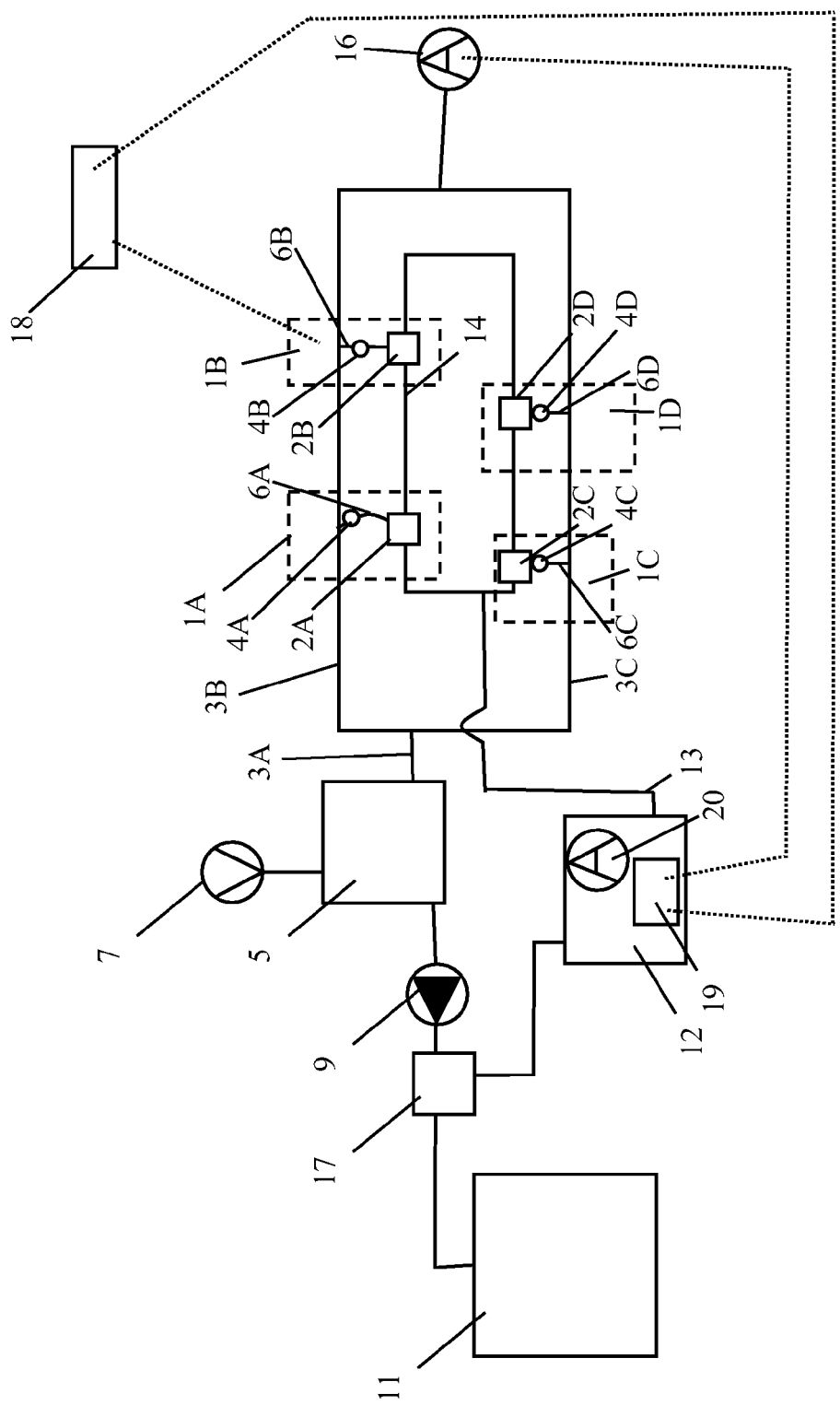
FIG. 2 illustrates an alternative embodiment of the milking system.

FIG. 1 also illustrates cleaning equipment for the milking system comprising a cleaning unit 12 and a cleaning line 13 connected to the cleaning unit 12. The cleaning line 13 comprises a cleaning device 14 arranged at the milking stations, and is arranged to provide cleaning liquid to the milking system via the cleaning device. In the figure, teat cup units 2A-C is connected to the cleaning device, whereas teat cup unit 2D are positioned at the milking stations for attachment to the animals to be milked. During the cleaning process, all the teat cups are connected to the cleaning device (as illustrated in FIG. 2).

The cleaning unit also comprises internal elements (not illustrated), such as water supply valves, a dosing pump for adding solvent to the cleaning liquid, a heating element for heating the cleaning liquid, so that cleaning can be performed in common ways such as using water, heated water and water with a solvent as cleaning liquid.

During cleaning, the cleaning liquid is supplied via the cleaning line 13 to the milking stations 1A-D through the cleaning device 14. The vacuum source 7 is then used to draw the cleaning liquid through the milking system from the milking stations 1A-D to the milk conduit 3. The cleaning liquid flows through the milk conduit 3 to the receiver 5. From the milk receiver 5 it is pumped by the milk pump 9 via a valve arrangement 17 back to the cleaning unit 12. The valve arrangement 17 is arranged to selectively connect the milk pump 9 to the cooling tank 11 and the cleaning unit 12, respectively. Alternatively a hose can be used having one end connected to the milk pump 9 and its other end movable between the cooling tank 11 and the cleaning unit 12, thus providing a selectable connection. The cleaning liquid can then be circulated through the system. The cleaning unit 12 is also connected to an outlet (not shown) for discharging used cleaning liquid.

The cleaning unit also comprises an air injector 20 connected to the cleaning line. An air injector 16 is also connected to, and arranged at, the milk conduit 3. During cleaning the air injector 16 and/or 20 supplies air at atmospheric pressure into the milk conduit 3 or cleaning line, respectively, to enhance the cleaning efficiency by creating slugs of cleaning liquid. These slugs are created by the suction applied in front of the cleaning liquid and the air injected behind the cleaning liquid. The air injectors are controlled by a control unit 15. The control unit 15 monitors the measurements performed by the milk meters 4A-D and controls when the air injectors 16 and/or 20 supply air. In the illustrated embodiment, of FIG. 1, the control unit 15 also controls the cleaning unit 12. Dotted lines illustrate communication links between the control unit 15 and the air injector 16, the milk meters 4B (for clarity reasons only one is illustrated) and the cleaning unit 12, with internal air injector 20. The air injectors 16 and 20 can be used one at a time to inject air alternately during the cleaning process.

FIG. 2 illustrates an alternative layout of the milking system. The system comprises similar units as the system in FIG. 1, such as the milking stations 1A-D, teat cup units 2A-D, milk conduit 3, comprising milk lines 3A-C and milk hoses 6A-D, a receiver 5, a vacuum source 7 etcetera, which units have the same reference numbers as the units in FIG. 1. However, two control units 18, 19 are illustrated in FIG. 2. Instead of using one control unit to control of the milking stations and the cleaning unit, as the central control unit 15 in FIG. 1, the cleaning unit 12 comprises a cleaning control unit 19 and the milking stations 1A-D are controlled by a milking control unit 18. In this embodiment the milking control unit 18 not only controls the milking process, but also monitors the flow of cleaning liquid through the milk meters 4A-D during cleaning. The cleaning control unit 19 controls the cleaning unit 12, such as the supply of cleaning liquid, its internal air injector 20 and the air injector 16 at the milk line. Thus the milking control unit 18 is communicatively connected to the milk meters 4A-D at the milking stations 1A-D, illustrated by a dotted line (such as a communication link) and the cleaning control unit 19 is communicatively connected to the air injector 16, which is also illustrated by a communication link To control the timing of air injections of the air injector 16 in the milk line, the milking control unit 18 and the cleaning control unit 19 are communicatively interconnected, so that when the supply of cleaning liquid to the milking stations is large enough, as measured by the milk meters 4A-D and monitored by the milking control unit 18, then the cleaning control unit 19 controls the air injector 16 to apply air into the milk line. This communication is illustrated by a link (a dotted line) between the milking control unit 18 and the cleaning control unit 19. To control the timing of the air injector 20 in the cleaning unit the milking control unit 18 and the cleaning control unit communicates so that the air injector 20 of the cleaning unit injects air when the amount of cleaning liquid is enough at the milking stations as measured by the milk meters 4 in the milk hoses 6.

In both the illustrated configurations the result of sensing the liquid is transferred from the flow meters, e.g. milk meters, and the result is used to control the injections when the amount of cleaning liquid is suitable to create a slug that flushes the milk conduit. The information transfer can be provided in several ways, e.g. the illustrated the milk meters 4 communicate with a central control unit 15, a milking control unit 18 or a cleaning control unit 19 directly or via a milking control unit 18.

In one embodiment, of the method according to the invention, the air injections are controlled by sensing the cleaning liquid in the milk hose and, when a sufficient amount is present, instruct one of the air injectors 16, 20 to supply air in real-time.

In another embodiment the presence of cleaning liquid is sensed and a control time is determined, which control time is used to set a timing, or injection time, for the air injections. This time setting is then used during future cleaning operations. This can be performed when installation new equipment. During the installation an adjustment phase is performed to provide a suitable timing for the air injections, which timing is then used during regular cleaning phases. In this embodiment the control time can be determined several times for consecutive cleaning liquid supply operations and a mean value, such as a weighted mean value or filtered value, of the supply operations can be used for setting the time. This time setting should be used during installation of new systems, but can also be used, for example, for calibrating the system at regular intervals.

Although the use of milk meters for sensing the cleaning liquid is preferred, other flow meters can be used. It is also possible to use level measures or level detectors for sensing the level of cleaning liquid in the milk line, which sensed level is then used for controlling the air injectors to supply air when the amount of cleaning liquid is enough for creating a slug of cleaning liquid. The flow is measured by the milk meters in the milk hoses at the milking stations, which flow is then, e.g., used to determine when a sufficient amount is available in the milk line to control the air injectors providing slugs in the milk line. Thus, the cleaning liquid is sensed in the milk hoses 6 at the milking stations and the air is injected into a common milk line 3. An alternative is to use a flow sensor, at least one, arranged in the milk line 3 (especially at 3B and/or 3C in the figures) and then to inject air, using an air injector 16, into the milk line.

Also, the monitoring can track changes in the measurements between cleaning operations. Especially, measuring flow during the flushing of slugs can be used to detect obstructions of the flow, such as a defective valve or a choked inlet of an air injector. The control unit can be adapted to alarm when deviations of the measurements increases and become larger than reference values since large deviations indicates changes in the system, possibly malfunctioning and the need for service in the system. Thus, the system is adapted to alarm when measured flows from successive cleaning operations differ more than a predefined threshold.

Having air injectors in the cleaning side of the system, i.e. supplying air behind the cleaning liquid in the cleaning line, at a position before the milking stations in the flow direction flushes not only the milk line, of the milk conduit, but also the milking stations. The air injector 16 at the milking conduit and the air injector 20 at the cleaning line 13 are both used during the cleaning process, but preferably not simultaneously. Instead they are controlled to inject air one at a time into the milk conduit and cleaning line, respectively.

The embodiments in the figures illustrates four milking stations connected to a common milk line but can be used also in installations where every milking station has an individual milk line. The invention is also beneficial in large milking parlors, for example having about 20 to 80 milking stations, where the system is more complex and where basing the air injections on determined liquid presence will be of particular value for reliability and efficiency.

A preferred embodiment of a milking system and a method of cleaning the system according to the invention have been described. A person skilled in the art realises that this could be varied within the scope of the appended claims.

The invention claimed is:
1. A method of monitoring a cleaning operation of a milking system comprising the steps of:
   connecting a teat cup and a milk hose with a cleaning device;
   supplying a vacuum pressure to a milk conduit connected to an outlet of the cleaning device;
   supplying cleaning liquid, via a cleaning line, into the milk hose;
   detecting a presence of the cleaning liquid in the milk system;
   setting a time based on the detection of the presence of the cleaning liquid in the milk system during said detecting step;
   after detecting the presence of the cleaning liquid, and as a result of the detection of the presence of the cleaning liquid, using said set time for injecting air into one of i) the cleaning line and ii) the milk conduit so that slugs of cleaning liquid are created by the suction pressure applied in front of the detected cleaning liquid and the air injected behind the detected cleaning liquid, the created slugs of cleaning liquid flushing the milk conduit;
   transferring a result of the step of detecting to a control unit (15, 18, 19); and
   controlling said step of injecting air from said control unit (15, 18, 19) based on the result.
2. The method of claim 1, wherein,
   the injecting air step uses an air injector connected to the milk conduit for injecting the air into the milk line.
3. The method of claim 1, wherein,
   the injecting air step uses an air injector for injecting the air into the cleaning line.

4. The method of claim 1, wherein,
the injecting air step uses plural air injectors connected for injecting the air into the one of i) the cleaning line and ii) the milk conduit.

5. The method of claim 1, wherein,
the injecting air step includes injecting air into the cleaning line at a first time and injecting air into the milk conduit at a second time, and
the step of detecting the cleaning liquid is performed at a time between the first time and the second time.

6. The method of claim 1, wherein,
the injecting air step includes separately i) injecting air into the milk conduit, and ii) injecting air into the cleaning line.

7. The method of claim 1, comprising the further step of:
alarming when performance data from an individual cleaning operation deviates from performance data reference values.

8. The method of claim 1, wherein,
in said cleaning liquid detecting step, a milk meter is used to detect the presence of the cleaning liquid.

9. A method of monitoring a cleaning operation of a milking system comprising the steps of:
connecting a teat cup and a milk hose with a cleaning device;
supplying a vacuum pressure to a milk conduit connected to an outlet of the cleaning device;
supplying cleaning liquid, via a cleaning line, into the milk hose;
detecting a presence of the cleaning liquid in the milk system;
after detecting the presence of the cleaning liquid, and as a result of the detection of the presence of the cleaning liquid, injecting air into one of i) the cleaning line and ii) the milk conduit so that slugs of cleaning liquid are created by the suction pressure applied in front of the detected cleaning liquid and the air injected behind the detected cleaning liquid, the created slugs of cleaning liquid flushing the milk conduit,
wherein the steps of injecting cleaning liquid, applying the suction pressure, and detecting the presence of cleaning liquid define an adjustment phase, and said steps of supplying cleaning liquid, applying a suction pressure, and supplying air define a cleaning phase, and
wherein said adjustment phase includes setting a time, which time is based on said detecting step, and said cleaning phase comprises using said set time for timing said step of injecting air, wherein,
the step of detecting the presence of cleaning liquid is repeated, and
the time is based on the at least two of the detecting steps.

* * * * *

UNITED STATES PATENT AND TRADEMARK OFFICE
CERTIFICATE OF CORRECTION

PATENT NO. : 8,443,757 B2  Page 1 of 1
APPLICATION NO. : 12/675226
DATED : May 21, 2013
INVENTOR(S) : Westman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 410 days.

Signed and Sealed this
Eighth Day of September, 2015

Michelle K. Lee
*Director of the United States Patent and Trademark Office*